Oct. 11, 1960    J. K. HULBERT    2,955,780
FLUID SUSTAINED AND FLUID PROPELLED FLYING VEHICLE
Filed Aug. 11, 1958    2 Sheets-Sheet 1

Inventor:
John K. Hulbert
By: Frank C. Parker Atty.

Oct. 11, 1960 J. K. HULBERT 2,955,780
FLUID SUSTAINED AND FLUID PROPELLED FLYING VEHICLE
Filed Aug. 11, 1958 2 Sheets-Sheet 2
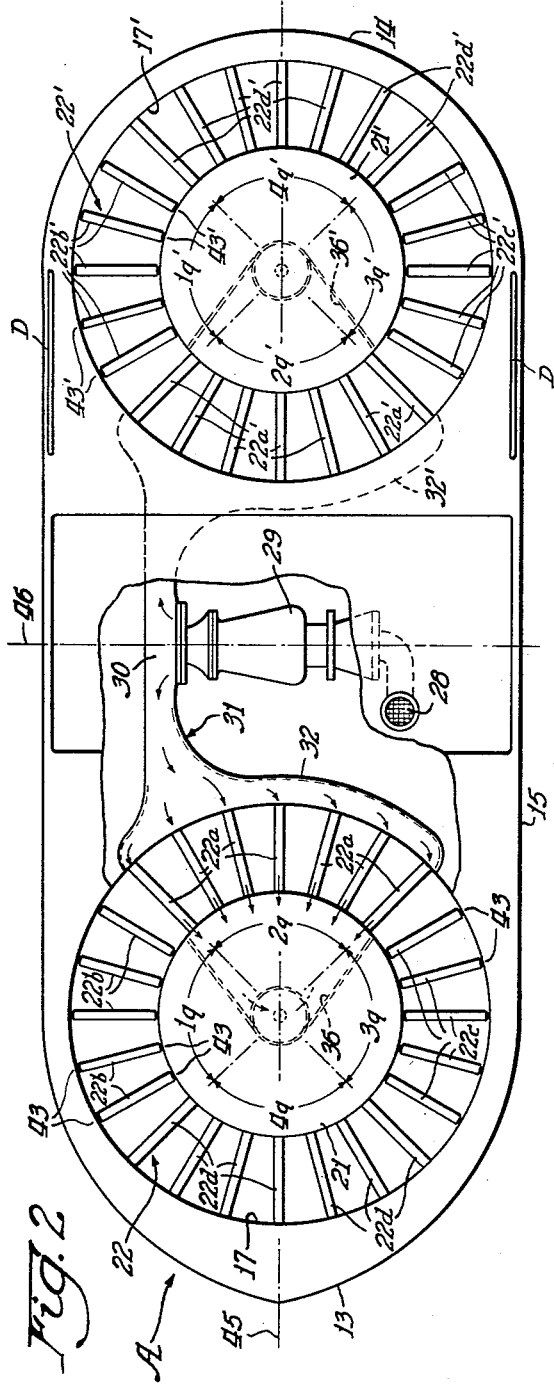
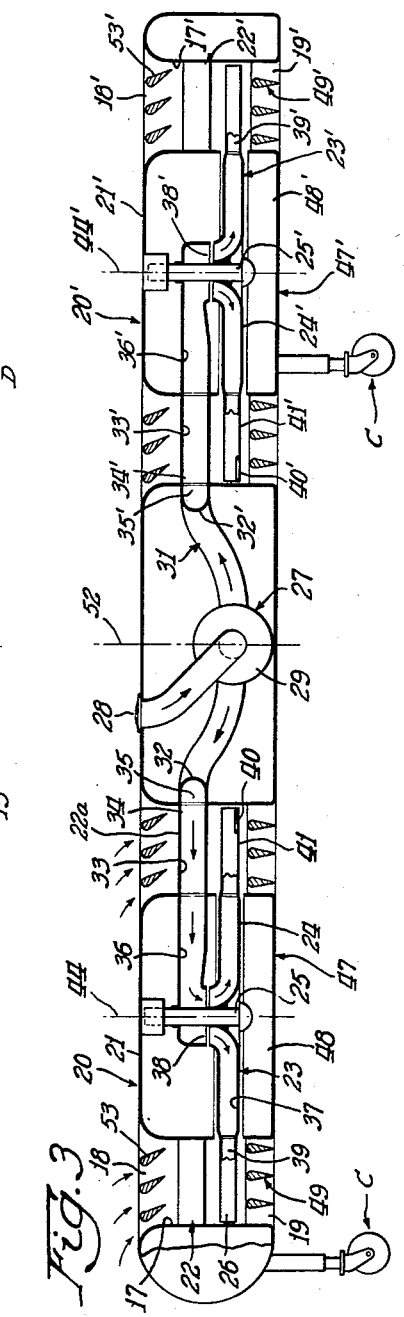
Inventor:
John K. Hulbert
By: Frank C. Parker Atty.

United States Patent Office 2,955,780
Patented Oct. 11, 1960

2,955,780
FLUID SUSTAINED AND FLUID PROPELLED FLYING VEHICLE

John K. Hulbert, Tonawanda, N.Y., assignor to Borg-Warner Corporation, Chicago, Ill., a corporation of Illinois Filed Aug. 11, 1958, Ser. No. 754,215
9 Claims. (Cl. 244—23)

This invention relates to a flying vehicle, and, in particular to a flying vehicle which is adapted to perform hovering flight conditions.

Heretofore, many different types of aircraft have been designed which are adapted to execute hovering flight. These prior known aircraft, of course, are also capable of executing substantially vertical flight take-offs and landings as well as other conventional flight conditions, and, therefore, are particularly desirable for performing flight missions in rough terrain as well as other missions commensurate with hovering type aircraft such as rescue and reconnaissance operations. Such aircraft are also particularly adapted for private use because they have greater maneuverability than conventional types of aircraft and do not require lengthy runways and special airports. The helicopter is an example of such aircraft. In order for hovering type aircraft to perform these particular flight conditions, it is necessary that a control system in combination with a propulsion system of the hovering type aircraft create and modulate lift and down forces, thrust and drag forces, port and starboard forces, rolling moment, directional moment, and pitching moment of the aircraft.

Generally, in these prior known hovering type aircraft, the propulsion system includes a rotatable rotor means having a plurality of rotor blades which react against the air to provide lift for the aircraft. Variations in the above-mentioned forces and moments are provided by selectively varying the speed of rotation of the rotor blades, the angle of attack of the rotor blades by varying the pitch thereof, the aerodynamic effect of certain airfoils, and also the auxiliary forces created by other propulsion apparatus disposed remote from the main rotor means. The main rotor means is usually rotated by being interconnected, through suitable mechanical gear trains and couplings, to a conventional aircraft internal combustion engine. The mechanical or other well known type rotor blade pitch changing means is incorporated in the drive means of the rotor blade.

Although these prior known forms of propulsion and control systems for hovering type aircraft have performed successfully, it has been desirable to design a hovering type aircraft which will not only provide the same maneuverability as these previous designs, but will also incorporate a propulsion and control system that is relatively simple or non-complex and easy to maintain maintenance-wise. It has been found that a mechanical drive means between an internal combustion engine and the rotor means together with rotor blade pitch changing mechanism provides rather complicated structures that readily lend themselves to difficult maintenance problems and lengthy repair times as well as relatively high initial aircraft production and replacement parts costs. Because many parts are required for these structures, it is also necessary to devote large areas for storing the many different parts in order to provide adequate servicing of the aircraft when needed. Further, highly skilled personnel must be trained in order to service the complicated control and propulsion systems. Therefore, if a propulsion and control system for hovering type aircraft could be designed eliminating these two features as well as other related complicated structures and control means, the resulting aircraft would be highly desirable as a low production cost, hovering type flying vehicle which would not only adequately perform the various flight conditions of the other types of hovering type vehicles, but could be readily maintained with a minimum of maintenance and thereby provide a commercially saleable aircraft for private as well as military use. It is, therefore, an object of this invention to provide such a hovering type flying vehicle.

It is another object of this invention to provide a hovering type flying vehicle having a simplified propulsion and control system.

It is another object of this invention to provide a hovering type flying vehicle having a propulsion system which utilizes the principle of an ordinary ducted fan to provide various flight forces and moments for the vehicle.

A further object of this invention is to provide a flying vehicle utilizing rotor means having a plurality of rotor vanes which react against air entering air duct means and force the air substantially downwardly out of the duct means to thereby provide lift for the flying vehicle.

Another object of this invention is to provide a flying vehicle in accordance with the preceding object where the rotor means is rotated by the reaction of gas from a gas source being expelled through exhaust passage means formed in the rotor vanes.

Another object of this invention is to provide in a flying vehicle, duct means, and rotor means disposed within the duct means, the rotor means having a plurality of rotor vanes which are adapted to react against air entering the duct means and force the air out of the duct means to thereby provide lift for the vehicle.

Another object of this invention is to provide in a flying vehicle, duct means, the duct means having air inlet and air outlet means, rotor means disposed within the duct means, the rotor means having a plurality of rotor vanes adapted to react against air entering the duct means and force the air out through the outlet means to thereby provide lift for the vehicle, means operatively associated with the rotor means for controlling the direction of the flow of air against which the rotor vanes react to thereby regulate certain flight conditions of the vehicle, and means operatively associated with the rotor means for controlling the direction of the flow of the air forced out of the outlet means to thereby regulate cetrain other flight conditions of the aircraft.

A further object of this invention is to provide in a flying vehicle, duct means, the duct means having air inlet and air outlet means, rotor means disposed within the duct means, the rotor means having a plurality of rotor vanes adapted to react against air entering the duct means and force the air out through the outlet means to thereby provide lift for the vehicle, means operatively associated with the rotor means for selectively controlling the direction of the flow of air against which the rotor vanes react to thereby regulate lift and down forces, rolling moment, and pitching moment of the vehicle, and means operatively associated with the rotor means for selectively controlling the direction of the flow of the air forced out of the outlet means to thereby regulate thrust and drag forces, port and starboard forces, and directional moment of the aircraft.

A still further object of this invention is to provide in the flying vehicle, formed in accordance with the preceding object, exhaust passage means formed in the rotor vanes, the exhaust passage means being in communication with a gas source whereby the reaction of the gas from the gas source being expelled through the exhaust passage means causes the rotor means to rotate so that the rotor vanes react against the air entering the duct means.

Other and more particular objects, uses, and advantages of this invention will become apparent from a reading of the following specification taken in connection with the accompanying drawings forming a part thereof and wherein:

Figure 2 illustrates, schematically, a top view of the vehicle illustrated in Figure 1, the top view being partially broken away to illustrate various parts thereof.

Figure 3 illustrates, in a partially broken away side view, the flying vehicle depicted in Figure 1.

Figure 1:
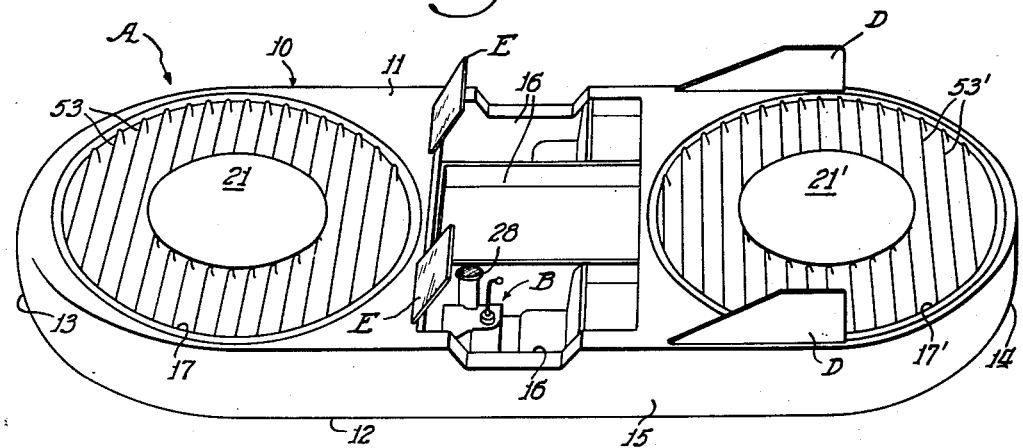
Figure 1 illustrates, in a perspective view, one form of a hovering type flying vehicle formed in accordance with the teachings of this invention.

Reference is made to the drawings wherein like reference numerals are used throughout the various figures thereof to denote like parts where appropriate, and particular reference is made to Figure 1, disclosing a hovering type flying vehicle, indicated generally by the reference letter A, having a vehicle body 10. The vehicle body 10 includes substantially flat parallel top 11 and bottom 12, each having a pair of opposed, substantially arcuate, end portions 13 and 14. A continuous, substantially vertically disposed side portion 15, suitably secured to or formed integrally with the top 11 and bottom 12, spaces the top 11 from the bottom 12 and extends completely around the perimeters thereof and may be feathered thereto to create a streamlined airfoil effect for the body 10. It is to be understood that the body 10 may be formed in any suitable manner and with any suitable design, the configuration illustrated in the drawings being merely one example thereof. The arcuate portion 13 may be formed substantially bullet-shaped and thereby provide the forward or nose end of the flying vehicle with the arcuate portion 14 forming the aft or rear end thereof. The vehicle body 10 is provided with centrally disposed cargo and man carrying compartments or cavities 16 interrupting the top 11, each compartment 16 may be exposed or enclosed as desired. The port cavity 16 may be provided for the pilot of the vehicle and contains aircraft control means B, the starboard cavity 16 may be utilized for passengers, and the middle cavity 16 for armament and/or cargo as is illustrated in the drawings. Suitable landing gear means C, airfoil tabs D, and windshields E may also be secured to the vehicle body 10.

A pair of substantially cylindrical air ducts 17 and 17' pass substantially vertically through the top 11 and bottom 12 of the vehicle body 10 and are disposed fore and aft of the cavities 16. Since the forward or front air duct 17 and the parts associated therewith, hereinafter described, are identical to the aft or rear air duct 17' and the parts associated therewith, except for the direction of rotation therein, like reference numerals will be used for like parts except that the reference numerals for those parts associated with the aft duct 17' will be designated with a prime. Further, while only two ducts, 17 and 17' are disclosed, it is to be understood that one or more may be utilized in order to practice this invention.

As shown in Figure 3, the air ducts 17 and 17' have, respectively, air inlet means 18 and 18' adjacent the top 11 of the vehicle body 10 and air outlet means 19 and 19' adjacent the bottom 12 of the vehicle body 10.

Stators, indicated generally at 20 and 20', are disposed respectively within the ducts 17 and 17' adjacent the air inlet means 18 and 18'. Each stator 20 or 20' comprises a cylindrically shaped hollow hub 21 or 21', concentrically disposed within the air duct 17 or 17', and supported therein by a plurality of radially disposed stator or air guide vanes 22 or 22', each connected at one end thereof to the hub 21 or 21' and at the other end thereof to the wall of the duct 17 or 17'.

Rotors, indicated generally at 23 and 23', are respectively disposed within the ducts 17 and 17', beneath and adjacent to the stators 20 and 20'. Each rotor 23 or 23' comprises a hollow hub 24 or 24', concentrically disposed within the duct 17 or 17' and supported on a shaft 25 or 25' suitably journalled in and carried by bearing means secured to the stator hub 21 or 21'. Each shaft 25 or 25' is adapted to be rotated relative to the respective stator hub 21 or 21'. Each rotor 23 or 23' is provided with a plurality of radially disposed rotor vanes 26 or 26' suitably affixed to the rotor hub 24 or 24', the rotor vanes 26 and 26' each having an appropriately curved cross-sectional configuration. In this manner the rotors 23 and 23' are adapted to be rotated relative to the stators 20 and 20' within the respective air ducts 17 and 17'. It should be understood that the rotor vanes 26 and 26' are angularly disposed with respect to the hubs 24 and 24' and the ducts 17 and 17' for a purpose hereinafter described.

As shown in Figures 2 and 3, a gas source or gas producing device 27, such as a conventional turbojet engine, is centrally disposed within the vehicle body 10 at a point substantially beneath the storage compartment or cavity 16 and is provided with an air inlet 28, a combustion chamber 29, and an exhaust gas outlet 30. The gas producing device 27 functions in a manner well known in the art and need not be described in detail. It is sufficient merely to state that, as a result of the operation of said gas producing device 27, the resulting exhaust gases thereof are expelled under pressure out through the outlet 30. It is to be understood that there are many different ways to provide a source of hot exhaust gases, such as by decomposition or combustion of chemical compounds, and this invention is not to be limited to any particular form. The feature deemed important and essential to this invention is to provide a source of gas suitable for the purposes hereinafter described.

Figure 5:
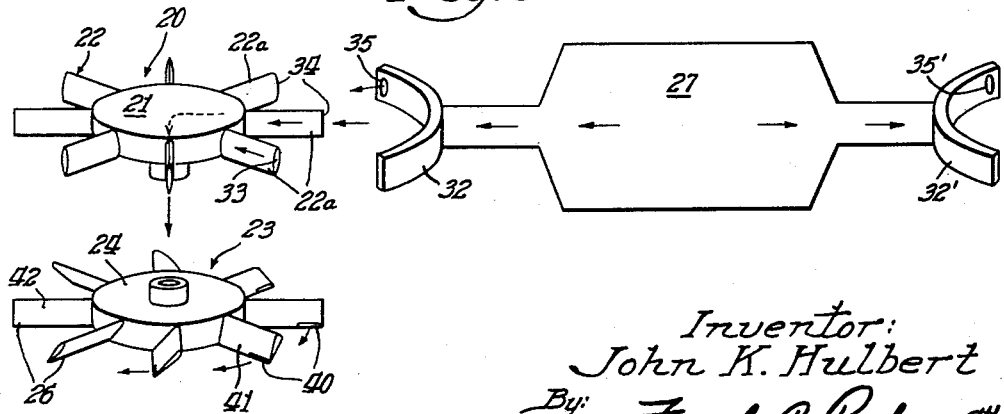
Figure 5 illustrates, schematically, the various propulsion components for the flying vehicle illustrated in Figure 1.

As shown in Figures 2, 3, and 5, the exhaust gas from the gas producing device 27 is directed from the exhaust outlet 30 to an interconnected exhaust gas manifold, indicated generally at 31. The exhaust manifold 31 is provided with substantially arcuate portions 32 and 32' which respectively extend adjacent to and partially around the air ducts 17 and 17' adjacent the stators 20 and 20'.

Certain of the stator vanes 22 and 22', indicated by the reference numerals 22a and 22a', are formed with passage means 33 and 33' extending longitudinally therethrough and terminating at the outer ends 34 and 34' thereof in fluid communication with cooperating outlet ports 35 and 35' formed respectively in the manifold portions 32 and 32'. The passage means 33 and 33' within the stator vanes 22a and 22a' are, in turn, in fluid communication with chambers 36 and 36' formed in the hollow stator hubs 21 and 21' respectively. The chambers 36 and 36' of the stator hubs 21 and 21' are, in turn, in fluid communication with chambers 37 and 37' formed respectively in the hollow rotor hubs 24 and 24' by substantially centrally disposed passage means 38 and 38'.

Each of the rotor vanes 26 or 26' is formed with exhaust passage means 39 or 39' extending longitudinally therethrough which is in fluid communication at the inner end thereof with the interior chamber 37 or 37' of the hollow rotor hub 24 or 24', and is in fluid communication at the outer end thereof with an exhaust port means 40 or 40' (see Figure 5) formed in trailing surface means 41 or 41' of the rotor vane 26 or 26'.

The exhaust fluid or gas is communicated from the gas source 27, when desired by selectively, manually, or automatically operating suitable gas source control means (not shown), through the manifold 31, the passage means 33 and 33' of the stator vanes 22a and 22a', the chambers 36, 36', and 37, 37' of the respective stator hubs 21 and 21' and rotor hubs 24 and 24', exhaust passage means 39 and 39' of the rotor vanes 26 and 26' and is expelled out through the exhaust port means 40 and 40' thereof. The reaction of the thus expelled gas causes the rotors 23 and 23' to rotate in substantially the opposite direction from that of the expelled gas whereby surface means 42 or 42' of each of the rotor vanes 26 or 26' react against the air entering the ducts 17 and 17' through the inlet means 18 and 18' and force the air substantially downwardly out through the outlet means 19 and 19' to thereby provide lift for the flying vehicle.

Figure 4:
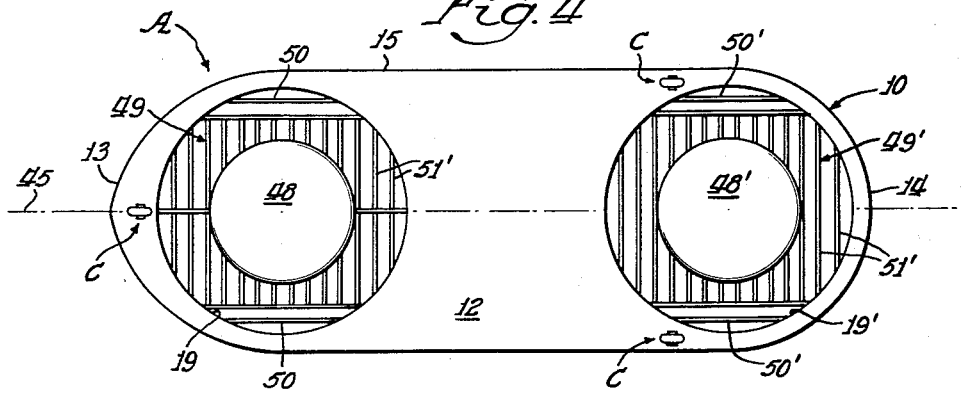
Figure 4 illustrates a bottom view of the vehicle illustrated in Figure 1.

As previously stated, it was found desirable to eliminate complicated pitch changing mechanism and controls for the rotor vanes or blades of hovering type aircraft and, therefore, some means must be provided to change the angle of attack of the rotor vanes 26 and 26', or the equivalent thereof, in order to permit variations in the lift and down forces of the propulsion means, the lift forces being created by the rotor vanes 26 and 26', reacting against the air in the respective ducts 17 and 17'. One such means is illustrated in Figures 2, 3, and 4 and will now be described.

Certain of the stator vanes 22 and 22', designated by the reference numerals 22b, 22b', and 22c, 22c' are adapted to be selectively adjustable. The adjustable stator vanes 22b, 22b', 22c, and 22c' are adapted for rotation about longitudinal pivot axes and are supported on pivot pins 43 and 43' secured at each end of the vanes and are respectively journalled in the stator hubs 21 and 21' and the walls of the ducts 17 and 17'. Suitable mechanical or other well known control means (not shown) are provided whereby the pilot and/or an automatic control device is adapted to selectively rotate each group of stator vanes 22b, 22b', 22c, or 22c' independently of the other groups or in unison therewith about their respective pivot axes in either direction thereby changing the angle that the chords of the stator vanes make with respect to vertical axes 44 and 44' passing through the centers of the stator hubs 21 and 21' and rotor hubs 24 and 24'. This is accomplished by rotating the pivot pins 43 and 43' journalled in the walls of the ducts 17 and 17' whereupon the vanes 22b, 22b', 22c, and 22c' will be rotated.

In the embodiment illustrated in the drawings, the stator vanes 22 and 22' are arranged in quadrants (see Figure 2) about the respective vertical axes 44 and 44' whereby the stator vanes 22b and 22b' are disposed in quadrants 1q and 1q' respectively; stator vanes 22a and 22a' in quadrants 2q and 2q' respectively, stator vanes 22c and 22c' in quadrants 3q and 3q' respectively, and the remaining stator vanes 22d and 22d' in quadrants 4q and 4q' respectively. It should be noted that quadrants 1q and 1q' are disposed on one side of a longitudinal center line axis 45 of the vehicle body 10 and that quadrants 3q and 3q' are disposed on the other side thereof. In the embodiment illustrated the stator vanes 22a, 22a', 22d, and 22d', disposed respectively in quadrants 2q, 2q' and 4q, 4q', are non-adjustable.

Since the stator vanes 22 and 22' are disposed respectively between the air inlet means 18 and 18' and the rotor vanes 26 and 26', it can be seen that by selectively adjusting the angular disposition of the vanes 22 and 22' relative to the rotor vanes 26 and 26', the direction of the flow of the air against which the rotor vanes react will be changed and thereby, in effect, change the angle of attack of the rotor vanes 26 and 26' with respect to the direction of the flow of air within the ducts 17 and 17', in much the same manner as if the rotor vanes 26 and 26' have been rotated about their longitudinal axes. In other words, by adjusting the stator vanes 22 and 22' about their respective pivot axes, the angle the stator vane chords make with respect to the vertical axes 44 and 44' will determine the angle that the direction of the flow of the air, against which the rotor vanes 26 and 26' react, will make with respect to the vertical axes 44 and 44' and thus change the angle that the chords of the rotor vanes 26 and 26' make with respect to the direction of the flow of the air. By thus changing the direction of the flow of the air the velocity vector or resulting lift force created by the rotor vanes 26 and 26' reacting thereagainst will be changed.

When the angular disposition of the stator vanes 22b, 22b', and 22c, 22c', within respective quadrants 1q, 1q', and 3q, 3q', are selectively adjusted about their pivot axes, defined by the pivot pins 43 and 43', identically or collectively, the stator vanes 22b, 22b', 22c, and 22c' thereby change the direction of the part of the flow of the air against which the rotor vanes 26 and 26' react beneath the quadrants 1q, 1q', 3q, and 3q' in the same manner whereby the reaction force of the air forced out of each duct 17 and 17' is changed identically, thereby affecting the vertical flight condition of the vehicle.

When the stator vanes 22b and 22b' in quadrants 1q and 1q' are adjusted differentially with respect to the stator vanes 22c and 22c' in quadrants 3q and 3q', the change in the direction of the flow of the air beneath one of the pairs of quadrants will result in providing a greater lift force on that respective side of the longitudinal axis 45 of the vehicle body 10 than that provided beneath the other pair of quadrants on the other side of the axis 45, thereby, causing the vehicle to roll about the longitudinal axis 45. In this manner the stators 20 and 20' provide means for varying the rolling moment of the vehicle.

In order to provide for variable pitching moment of the flying vehicle, it is merely necessary to adjust the stator vanes 22b and 22c in quadrants 1q and 3q of the forward duct means 17 identically but differentially with respect to the stator vanes 22b' and 22c' in quadrants 1q' and 3q' of the aft duct means 17', thereby causing one of the ducts 17 or 17' to provide a greater lift force than the other whereby the vehicle body 10 rotates about a horizontal axis 46. The horizontal axis 46 passes through the center of gravity of the vehicle A and is disposed substantially perpendicularly with respect to the longitudinal axis 45.

Therefore, it can be seen that the stators 20 and 20' not only provide means for communicating gas from the gas source 27 to the rotor vanes 26 and 26' in order to provide a reaction force for rotating the rotors 23 and 23', but also provide means for controlling lift and down forces, rolling moment, and pitching moment of the flying vehicle A.

The means for controlling the thrust and drag forces, port and starboard forces, and directional moment of the flying vehicle will now be described. As shown in Figures 3 and 4, stators 47 and 47' are disposed respectively within the duct means 17 and 17' adjacent the outlet means 19 and 19'. Each stator 47 or 47' comprises a stator hub 48 or 48' having a plurality of stator or air guide vanes 49 or 49' arranged about the stator hub 48 or 48' as follows. Certain of the stator vanes 49 and 49', designated by the reference numerals 50 and 50' respectively, are disposed substantially parallel to and on each side of the longitudinal axis 45 of the vehicle body 10. Others of the stator vanes 49 or 49', designated by the reference numerals 51 and 51' respectively, are disposed substantially perpendicular with respect to the longitudinal axis 45 of the vehicle body 10.

The stator vanes 50 and 50' are adapted to be selectively adjustable about their longitudinal axes by control means in the same manner as the stator vanes 22b, 22b', 22c, and 22c'; and, similarly, the stator vanes 51 and 51' are adapted to be selectively adjustable about their longitudinal axes by the control means, the control means being operated by the pilot and/or automatically as previously stated for the stators 20 and 20'. The stator vanes 50, 50′, 51, and 51′ are adapted to control the direction of at least part of the flow of the air forced out of the outlet means 19 and 19′. By adjusting or varying the angle that the chords of the stator vanes 51 and 51′ make with respect to the vertical axes 44 and 44′, part of the flow of the air forced out of the ducts 17 and 17′ can be directed fore or aft of the vehicle body 10. Therefore, by adjusting the stator vanes 51 and 51′, the thrust and drag forces of the flying vehicle A can be regulated. Similarly, by adjusting the stator vanes 50 and 50′ so that part of the flow of the air forced out of the ducts 17 and 17′ is directed sideways from the vehicle body 10, port and starboard forces are varied thereby effecting sideways flight conditions of the vehicle. In order to provide for directional moment of the vehicle, it is merely necessary to adjust the stator vanes 50 of the duct means 17 differentially with respect to the stator vanes 50′ of the duct means 17′ to thereby cause the vehicle to rotate about a vertical axis 52 passing through the previously mentioned center of gravity of the flying vehicle A.

As shown in Figures 1 and 3, a plurality of stationary air guide vanes 53 and 53′ are respectively disposed across the top of the ducts 17 and 17′ and are arranged substantially perpendicular to the longitudinal axis 45 and vertical axis 52. These vanes 53 and 53′ are so disposed that they improve the flow of the air entering the ducts 17 and 17′ and are particularly adapted to improve that flow when the vehicle A is flying or moving forwardly.

The operation of the flying vehicle A will now be described. When the vehicle is ready for flight, the pilot first starts the gas producing device 27 so that exhaust gas is expelled from the exhaust port means 40 and 40′ of the rotor vanes 26 and 26′ and thereby causes rotation of the rotors 23 and 23′.

*Lift and down forces*

When it is desired to make a vertical takeoff from the ground, the pilot merely regulates or adjusts the stator vanes 22b, 22b′, 22c, and 22c′, by means of the control means (not shown), identically, and in such a manner that the direction of the flow of the air against which the rotor vanes 26 and 26′ react below their respective quadrants 1q, 1q′, 3q, and 3q′ creates lift forces greater than the down force of the flying vehicle A, whereby the vehicle A raises vertically into the air. The rate of ascent or descent of the flying vehicle A can be varied by varying the lift forces created by the reaction of the rotors 23 and 23′ with the air in the ducts 17 and 17′, the lift forces being varied by adjusting the stator vanes 22b, 22b′, 22c, and 22c′ to thereby vary the direction of part of the flow of the air against which the rotor vanes 26 and 26′ react. When the flying vehicle A is in the air and it is desired to provide for hovering flight, the pilot merely adjusts the stator vanes in such a manner that the lift forces equal the down force to thereby position the flying vehicle A stationary in the air at the altitude where the forces become equal. Therefore, it can be seen that vertical landings can be readily made with a minimum of downward velocity of the vehicle A.

*Pitching moment*

When the pilot desires to change the pitch of the flying vehicle A, that is, rotate the vehicle body 10 about the axis 46, so that the nose of the vehicle A is lower than the rear during flight, he merely adjusts the stator vanes 22b and 22c in the duct 17 differentially with respect to the stator vanes 22b′ and 22c′ in the duct 17′, whereby the rotor vanes 26 create a smaller lift force than the lift force created by the rotor vanes 26′ and thus cause the rear of the vehicle A to raise and the nose to lower. When the desired pitch has been obtained, the pilot adjusts the stator vanes 22b, 22b′, 22c, and 22c′ in such a manner that the lift forces provided by each of the rotors 23 and 23′ are equal whereby the vehicle A will remain in that desired pitched position. By adjusting the stator vanes 22b and 22c differentially with respect to the vanes 22b′ and 22c′, whereby the rotor 23 creates a greater lift than the rotor 23′, the vehicle A will rotate about the axis 46 in the other direction, that is, the nose will raise and the rear will lower until the pilot permits the lift forces created by the rotor 23 to be equal to the lift forces created by the rotor 23′. It is obvious, therefore, that the pitching moment of the vehicle can be varied by thus varying the lift forces created by the rotor 23 with respect to the lift forces created by the rotor 23′.

*Rolling moment*

If the pilot desires to roll the vehicle A to the starboard, that is, rotate the body 10 about the longitudinal axis 45, so that the right side is lower than the left side, he merely adjusts the stator vanes 22b and 22b′, by means of the control means, identically with respect to each other but differentially with respect to the stator vanes 22c and 22c′ so that the lift force created by the rotors 23 and 23′ at the right side of the vehicle body 10 are smaller than the lift forces created on the left side of the vehicle body 10, whereby the body 10 rotates about the longitudinal axis 45 with the left side raising and the right side lowering. When the vehicle A has rolled to the desired position, the pilot adjusts the stator vanes 22b, 22b′, 22c, and 22c′ in such a manner that the lift forces on the right side of the axis 45 are equal to the lift forces on the left side of the axis 45 whereby the body 10 will remain in the desired rolled position. By adjusting the stator vanes 22b and 22b′ differentially with respect to the vanes 22c and 22c′ whereby the rotors 23 and 23′ create a greater lift on the right side of the body 10 than on the left side, the vehicle A will rotate about the longitudinal axis 45 in the other direction, that is, the left side will lower and the right side will raise until the pilot permits the lift forces on the right side to equal the lift forces on the left side of the vehicle A.

*Thrust and drag forces (horizontal flight)*

When the pilot desires to fly forwardly, he merely adjusts the stator vanes 51 and 51′, by means of the control means, in such a manner that the direction of part of the flow of the air forced out of the ducts 17 and 17′ is directed rearwardly of the vehicle body 10, thereby creating a forward thrust force for the vehicle A. By adjusting the stator vanes 51 and 51′ in the other direction so that the stator vanes 51 and 51′ direct part of the flow of the air forced out of the ducts 17 and 17′ forwardly of the vehicle body 10, the vehicle A will be propelled rearwardly. The rate of forward or rearward movement of the vehicle A, obviously, can be varied by increasing or decreasing the angle that the air is directed relative to the vehicle body 10.

*Port and starboard forces (sideways flight)*

When the pilot desires to have the vehicle A move sideways to the starboard or right, he merely adjusts the stator vanes 50 and 50′ so that the stator vanes 50 and 50′ direct part of the flow of air forced out of the ducts 17 and 17′ to the left of the vehicle body, thereby causing movement of the vehicle body 10 to the starboard or right. For sideways movement of the vehicle A to the left, the stator vanes 50 and 50′ are merely adjusted in the opposite direction to thereby cause part of the flow of the air forced out of the ducts 17 and 17′ to be directed starboardly and thus cause the vehicle A to execute port sideways flight. To prevent or stop sideways flight, the vanes 50 and 50′ are adjusted so that the direction of the flow of the air controlled thereby is not directed sideways.

*Directional moment*

When the pilot desires to change the directional moment of the vehicle A, that is, cause the vehicle body 10 to rotate or pivot about the vertical axis 52 of the vehicle body 10, he merely adjusts, by means of the control means, the stator vanes 50 in the duct 17, differentially with respect to the stator vanes 50' in the duct 17', whereby part of the air forced out of the duct 17 is directed sideways oppositely from part of the air forced out of the duct 17'. To execute directional movement to the port or left, the stator vanes 50 are adjusted to direct part of the flow of the air forced out of the duct 17 to the starboard and the stator vanes 50' are adjusted to direct part of the flow of the air forced out of the duct 17' to the port. When the vehicle A has reached the desired position, the vanes 50 and 50' are adjusted so that none of the air forced out of duct 17 is directed sideways differentially from the air forced out of the duct 17' whereby the vehicle A will take the heading of this desired position. By adjusting the stator vanes 50 and 50' conversely from that set forth above, the vehicle body 10 may be directed starboardly, that is, rotated about the axis 52 in the other direction with the nose moving to the right and the rear to the left.

It should be understood that since the stator vanes 22b, 22b', 22c, 22c', 50, 50', 51, and 51' are adapted to be adjusted infinitely and progressively, the lift and down forces, rolling moment, pitching moment, port and starboard forces, thrust and drag forces, and directional moment of the flying vehicle A are adapted to be varied infinitely and progressively thereby providing complete maneuverability of the vehicle A. Of course, by varying the stators 20, 20' and 47, 47' in various combinations, various forces and moments can be simultaneously varied.

It is also to be understood that if desired, the vehicle A may be propelled over the ground by varying the various forces and moments in the manner previously described, except that for propulsion on the ground the down forces of the vehicle A remain greater than the lift forces, thereby eliminating lift, pitching, and rolling moment of the vehicle.

It can be seen that there has been described a hovering type flying vehicle having a simplified propulsion and control system whereby rotors disposed within ducts formed in the vehicle body are driven by the reaction of expelled gas leaving the trailing surfaces of the rotor vanes to thereby cause the surfaces of the rotor vanes to react against air within the ducts and provide lift for the vehicle. Relatively simple control means are also provided in the ducts to vary the direction of the flow of the air against which the rotor vanes react to thereby regulate lift and down forces, rolling moment and pitching moment of the vehicle, and relatively simple control means are also provided in the ducts to vary the direction of the flow of the air forced out of the duct means by the rotor vanes to thereby regulate thrust and drag forces, port and starboard forces, and directional moment of the vehicle.

While this invention has been disclosed in connection with one specific embodiment thereof, it is to be understood that this was by way of example rather than limitation, and it is intended that the invention be defined by the appended claims.

What is claimed is:

1. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; and means for controlling the direction of at least part of the flow of the air forced out of said outlet means to thereby regulate thrust and drag forces of said vehicle.

2. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; and means for controlling the direction of at least part of the flow of the air forced out of said outlet means to thereby regulate port and starboard forces of said vehicle.

3. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; and means for controlling the direction of at least part of the flow of the air forced out of said outlet means to thereby reguate directional moment of said vehicle.

4. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; and means for controlling the direction of at least part of the flow of the air forced out of said outlet means to thereby regulate thrust and drag forces, port and starboard forces, and directional moment of said vehicle.

5. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; and means for controlling the direction of at least part of the flow of the air forced out of said outlet means to thereby regulate flight conditions of said vehicle.

6. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; adjustable guide vanes disposed adjacent said outlet means for controlling the direction of at least part of the flow of air forced out of said outlet means; and means for selectively adjusting at least some of said guide vanes to thereby vary the direction of said flow and thus vary thrust and drag forces, port and starboard forces, and directional moment of said vehicle.

7. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; means for controlling the direction of at least part of the flow of said air against which said rotor vanes react to thereby regulate certain flight conditions of said vehicle; and means for controlling the direction of at least part of the air forced out of said outlet means to thereby regulate certain other flight conditions of said vehicle.

8. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; means for controlling the direction of at least part of the flow of said air against which said rotor vanes react to thereby regulate lift and down forces, rolling moment, and pitching moment of said vehicle; and means for controlling the direction of at least part of the air forced out of said outlet means to thereby regulate thrust and drag forces, port and starboard forces, and rolling moment of said vehicle.

9. In a flying vehicle, duct means having air inlet and air outlet means; rotor means having a plurality of vanes and disposed within said duct means; means defining exhaust passage means in said rotor vanes; means providing a gas source; means communicating gas from said gas source to said exhaust passage means whereby said gas is expelled from said exhaust passage means of said rotor vanes causing said rotor means to rotate so that said rotor vanes react against air entering said duct means through said inlet means and force the air out through said outlet means and thereby provide lift for said vehicle; and means for controlling the direction of at least part of the flow of said air against which said rotor vanes react to thereby regulate flight conditions of said vehicle, said last mentioned means including stator means having passage means formed therein, said means communicating said gas from said gas source to said exhaust passage means including said stator means and manifold means interconnected with said gas source, said passage means in said stator means interconnecting said exhaust passage means with said manifold means.

References Cited in the file of this patent
UNITED STATES PATENTS

| | | |
|---|---|---|
| 2,377,835 | Weygers | June 5, 1945 |
| 2,461,435 | Neumann | Feb. 8, 1949 |
| 2,567,392 | Naught | Sept. 11, 1951 |
| 2,777,649 | Williams | Jan. 15, 1957 |
| 2,828,929 | Lippisch | Apr. 1, 1958 |

FOREIGN PATENTS

| | | |
|---|---|---|
| 754,579 | Great Britain | Aug. 8, 1956 |

OTHER REFERENCES

Popular Mechanics, July 1957, pages 74–77.